INVENTOR:
FRANK W. GUTZWILLER,
BY Melvin M. Goldenberg
HIS ATTORNEY.

INVENTOR:
FRANK W. GUTZWILLER,
BY Melvin M. Goldenberg
HIS ATTORNEY.

United States Patent Office 3,404,327
Patented Oct. 1, 1968

3,404,327

CONVERSION SYSTEMS COMPRISING SCR's WITH GATE CONTROL ARRANGEMENTS

Frank W. Gutzwiller, Lyons, N.Y., assignor to General Electric Company, a corporation of New York Filed Dec. 16, 1958, Ser. No. 780,801
16 Claims. (Cl. 321—8)

This invention relates to novel electrical translating apparatus. More particularly, it relates to a novel combination of a multi-junction, semi-conductor device, together with circuit means whereby current flow through the device may be controlled.

Multi-junction, semi-conductor devices consisting of alternating zones of p and n-types of semi-conducting materials in succession with each other have been known in the art for some time. Such devices have been constructed having four adjacent zones of p and n-type semi-conducting material, thus presenting three successive junctions. Further, it has been shown that when a first value voltage is applied to the end zones and the voltage is of the same polarity as the polarity of the majority carriers constituting the zone, the two outside or end junctions are forwardly biased while the inner or intermediate junction is reversely biased. As the forward voltage applied to the end junctions is increased, the current through the device will be substantially zero, i.e., only a very low leakage current will flow until a value of voltage which may be characterized as the "break-over" voltage is reached, at which point the current through the device will suddenly increase and will be a function of the applied voltage and the load impedance. It has further been found that if voltage is placed across the device so that the two end junctions are forwardly biased and the intermediate junction is reversely biased as before and a voltage of the proper polarity is supplied to one of the intermediate zones with respect to one of the end zones equal to or greater than a value fixed by the characteristics of the device, the direction of bias of the intermediate junction is reversed and current through the device will suddenly increase even though the voltage applied across the device does not exceed or equal the so-called "break-over" voltage. At this time, the voltage drop across the device again falls to a low value and the current again is limited essentially only by the impedance of a load which may be connected in series therewith.

Heretofore it has been proposed to utilize such devices by controlling the amount of potential supplied to their end zones in such a manner that the device will break down and conduct when the potential on the end zones exceeds a predetermined amount. Alternatively, it has been proposed that such devices may be controlled by impressing signals between either end zone and the intermediate zone contiguous therewith. It has been found, however, that the utility of such devices is considerably enhanced if circuits are provided for the control of such devices, which circuits control the phase relationship of a varying or alternating voltage to be supplied to an intermediate zone and an alternating voltage applied across the device at the end zones thereof. In this embodiment, the current supplied to a load in series with the device may be made subject to the requirements of an operator of a system. By the provision of such a control circuit, controlled duration of current flow through the device may be obtained to effect control of the amount of rectified or alternating current delivered to a load. Among other applications for such an apparatus would be its use in a closed loop control system wherein the phase relationship of the control voltage and the supply voltage is controlled by error signal proportional to the departure of an element from a predetermined condition.

Therefore, it is an object of this invention to provide a novel combination comprising a multi-junction, semiconductor device having an odd number of such junctions and constructed so that when a potential is applied across the end junctions thereof, an intermediate junction is normally reversed biased in combination with a circuit to control the phase and magnitude of a voltage applied to an intermediate zone in order to reverse the bias of the intermediate junction and thereby control the flow of current through the device.

It is another object of this invention to provide a novel combination of a multi-junction, semi-conductor device in series with a load supplied from an alternating current circuit in combination with a circuit to control the phase relationship and magnitude of a control voltage supplied to an intermediate zone of the device in order to control the current flow through the device.

It is still another object of this invention to provide a novel semi-conducting device having an odd number of p-n junctions and the characteristic of an inability to transfer current until a voltage applied to the end zones thereof exceeds a predetermined amount in combination with a circuit to control the phase and magnitude of a voltage supplied to an intermediate zone.

It is a further object of this invention to provide a novel signal translating apparatus comprising in combination a semi-conductor device having an odd number of p-n junctions and a circuit for controlling the conductivity of the device in a precise manner according to the requirements of a load in series with the device and a source.

It is a still further object of this invention to provide a novel apparatus for supplying a controlled voltage to a load, which apparatus utilizes a semi-conductor device having an odd number of p-n junctions and circuit supplying a control voltage variable in phase and magnitude to one of the junctions to control the conductivity of the device.

In accordance with one aspect of this invention, there is provided a semi-conductor device comprising an odd number of p-n junctions in succession with each other in a circuit supplied from an alternating current source and in series with a load, the current to which is to be controlled by the semi-conductor device. The invention also contemplates the provision of a phase shifting circuit capable of controlling the phase relationship of a control voltage supplied to an intermediate zone of said device with respect to a periodically variable supply voltage applied to the end zones in order that the initiation of the current flow through the device may be varied in time thereby to effect control of the amount of current delivered to a load connected to the device.

The subject matter which I regard as my invention is particularly pointed out and distinctly claimed in the concluding portion of this specification. My invention, however, both as to its structure and manner of operation together with further objects and advantages thereof may best be understood by reference to the following description taken in connection with the accompanying drawing in which:

Figure 1:
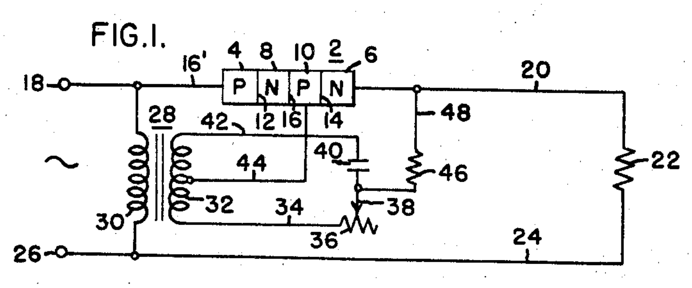
FIGURE 1 is a schematic illustration of one embodiment of the invention.

Referring to FIGURE 1 of the drawing, there is illustrated a semi-conductor device designated generally by reference numeral 2. As shown, the device is constituted by four contiguous zones of semi-conducting material. One end zone 4 is constituted by p-type semi-conducting material while the other end zone 6 is constituted by n-type semi-conducting material. The two inner or intermediate zones 8 and 10 are constituted by n and p-type semi-conductor materials respectively. The device is formed so that the adjacent zones abut each other presenting three junctions, a pair of end junctions 12 and 14 and an intermediate or center junction 16.

The device 2 is illustrated in the drawing in a schematic manner for the purposes of clarity and ease of explanation. The physical configuration of the device itself would, of course, depend on the values of the characteristics desired and the method of fabrication. Thus the actual device may be constituted by an intermediate n-zone 8 formed from a grown crystal of silicon suitably doped by addition of impurities to give it its n-type majority carriers and the other zones added thereto by alloying or diffusion. A conductor 16' has an ohmic connection at one end with the end zone 4 and at the other end to a terminal 18. The other end zone 6 has an ohmic connection with a conductor 20 which may be connected to a load which is illustrated in the drawing as a resistance 22. The load 22 is returned through a conductor 24 to a terminal 26. As is illustrated in the drawing, a source of alternating current may be connected to the terminals 18 and 26.

In order that the current through the load 22 may be controlled, this embodiment of the invention provides a source of alternating current voltage the magnitude and phase of which in relationship to the phase of the voltage supplied to the end zone 4 by the conductor 16' may be varied. In this embodiment of the invention, the phase shifting circuit is constituted by a transformer 28, a primary winding 30 which may be connected across the terminals 18 and 26. A secondary winding 32 is connected at one side by a conductor 34 to an adjustable resistive device such as the potentiometer 36. A slider 38 of the potentiometer 36 is connected to a capacitor 40, the other side of which is returned by a conductor 42 to the other end of the transformer secondary 32. A conductor 44 is connected at one end to a center tap of the transformer secondary 32 and to the intermediate zone 10 of the semi-conducting device 2 while the junction of the slider 38 and capacitor 40 is connected through a current limiting resistor 46 and conductor 48 to the conductor 20.

The operation of this apparatus may be described as follows. It may be seen that on one half cycle of the alternations supplied to the terminals 18 and 26, a positive voltage will appear on the end zone 4 of the device 2 with respect to the other end zone 6. Since these end zones 4 and 6 are formed of p and n-type materials as shown, the effect of the voltage applied through the ohmic contacts will be to forwardly bias the two outside junctions 12 and 14. At the same time, the intermediate junction 16 will be reversely biased and the current flow through the device will be of a very low order as it is due solely to leakage current and may be neglected. As the voltage across the device increases beyond a predetermined amount to a value called the "break-over" voltage, bias on the center junction 16 will reverse so that it will be forwardly biased and current will flow from the terminal 18 through the device 2, load 22 and to the terminal 26. While the application of voltage to the device 2 in this manner affords one method of controlling the current flow through the device, it is clear that the utility of the device is considerably enhanced if current could be supplied to a load at a level determined by some other variable than the supply voltage. Therefore, in accordance with my invention, the device is controlled by the application of a control voltage to the intermediate zone 10. In this embodiment of the invention, the control voltage supplied through the transformer 28 is likewise an alternating current voltage, the phase of which in relationship to the phase of the voltage applied to the end junction 4 may be shifted by adjusting the slider 38 on the adjustable resistance 36. In order to effect this, the adjustable resistance 36 in combination with the capacitor 40 provides a phase shifting circuit which acts to vary the phase of the voltage supplied to intermediate zone 10 with respect to the phase of the voltage supplied to end zone 4.

Figure 2:
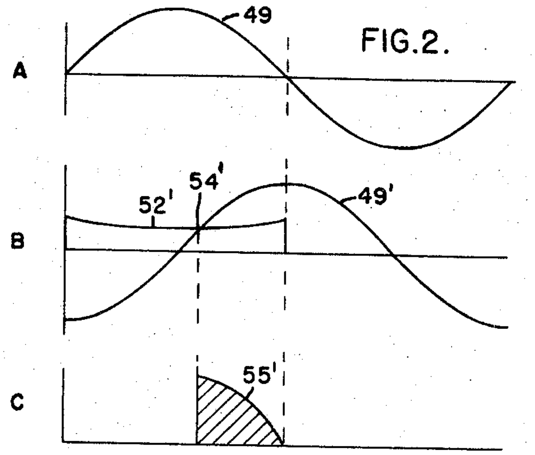
FIGURE 2 is a chart of voltage plotted against time illustrating the characteristics of a circuit such as shown in FIGURE 1.

At this point, reference may be had to FIGURE 2 in order to understand the effect of changing the phase of the voltage applied to the intermediate zone 10. In this figure, curve 49 in FIGURE 2A represents the variation in time of the voltage applied to the end zone 4 of the device 2. FIGURE 2B shows a curve 49' which represents the variation in time of a voltage applied to the intermiate zone 10 and retarded on the order of 90° in relation to the voltage represented by curve 49 by the action of the phase shifting circuit. Curve 52' is a plot of typical values of voltage which when supplied to the intermediate zone 10 will cause the intermediate junction 16 to become forwardly biased and the device to conduct current to the load 22. As may be seen in FIGURE 2B, the curve 49' intersects the curve 52' at a point 54'. At this point, the value of the voltage is such to cause the device 2 to break down and to conduct resulting in a current flow through the load 22, represented by the curve 55' in FIGURE 2C. As the phase of the curve 49' is shifted in relationship to the phase of the curve 49, the point 54' at which the curve 49' crosses the curve 52' moves either to the right or left and accordingly it may be seen that any desired amount of current may be caused to flow through the load device to be limited only by the applied voltage and the load impedance 22. It is to be noted that the curve 55' indicates that no current flows through the load 22 during the negative half cycle of the voltage represented by curve 49. As pointed out above, when the zone 4 is positive with respect to the zone 6, the outside junctions 12 and 14 are biased in a forward direction while the intermediate junction 16 is biased in a reverse direction. When the intermediate junction 16 is caused to be forwardly biased, i.e., when the curve 49' crosses the curve 52' as at point 54', the device 2 will conduct only as long as its end zone or anode 4 is positive with respect to its end zone or cathode 6. By a suitable selection of design parameters, such as junction size, zone width, selection of conductor sizes, all known in the art of fabricating semi-conductor devices, the characteristics of the device 2 are made such that when the zone 4 is negative with respect to the zone 6, the outside junctions 12 and 14 are reversely biased and no amount of majority carrier injection to the intermediate zones will be sufficient to cause the bias of the junctions to change and the device will therefore block current in the reverse direction.

Figure 3:
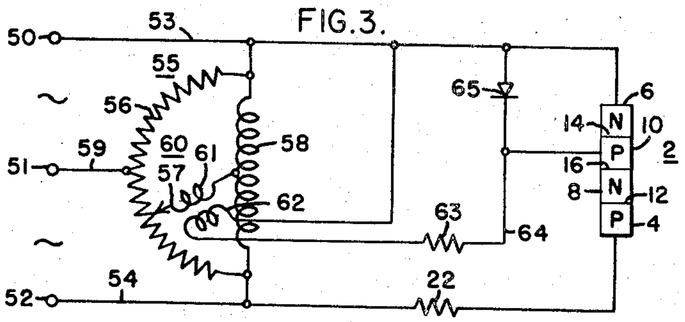
FIGURE 3 is a schematic illustration of an alternative embodiment of the invention.

In FIGURE 3 of the drawing, corresponding elements have been given the same reference numeral. In this embodiment of the invention, a source of three-phase alternating current is connected to a plurality of terminals 50, 51 and 52. A conductor 53 connects the terminal 50 to the end zone 6 of the semi-conductor device 2 while a conductor 54 connects the terminal 52 through load 22 to the other end zone 4. Connected across the conductors 53 and 54 is a potentiometer 55 having a resistance segment 56 and movable contact or slider 57. A fixed end of the slider 57 is connected to a tap on an impedance element such as an inductor 58. The inductor 58 is connected to the ends of the resistance segment 56 and functions to provide a reference potential midway between the voltages on 50 and 52. A conductor 59 connects a center tap on the resistance segment 56 to the terminal 51.

In order that a control voltage may be derived from the resistance segment 56, the means illustrated schematically may be used. A transformer 60 has a primary winding 61 connected between the contact of the slider 57 with the resistance segment 56 and the tap on the inductor 58. A secondary winding 62 of the transformer 60 has one end connected to the conductor 53 while the other end is connected via a current limiting resistor 63 and a conductor 64 to an ohmic contact with the intermediate p-zone or gate 10 of the device 2. Also, connected to the intermediate zone 10 is the cathode of a unilateral conducting device illustrated in the drawing as a diode rectifier 65, the anode of which is connected to the conductor 53.

The embodiment of the invention illustrated in FIGURE 3 functions to provide a variable phase control signal to the intermediate zone 10 over a range of 0° to 180°. As may be seen, when the slider 57 engages the resistance segment 56 of the potentiometer 55 at its upper end, the voltage supplied to the transformer 60 is the alternating voltage supplied to the conductor 53 through terminal 50 and is in phase with the voltage supplied to end n-zone or cathode 6. When this phase relationship exists between the voltage on the cathode and gate 10 inasmuch as the voltage does not exceed the value of the "break-over" voltage, substantially no current flows between the anode 4 and the outside n-zone or cathode 6. As the slider 57 is moved counterclockwise or toward the conductor 54, as illustrated in the drawing, the phase of the voltage on the gate 10 is shifted to become more in phase with the voltage on the anode 4 so that the point at which a positive voltage is equal to or in excess of that necessary to reverse the bias of the junction 16 moves to the left as illustrated in FIGURE 2B. This arrangement affords a means of changing the point at which the device conducts or its firing angle over a range of 0° to 180° of each half cycle of alternating voltage supplied to its anode. In this arrangement, the rectifier 65 may be connected between the gate 10 and cathode 6 to prevent excessive negative currents from flowing in the gate circuit to protect the device 2 from the deleterious effects of such currents.

Figure 4:
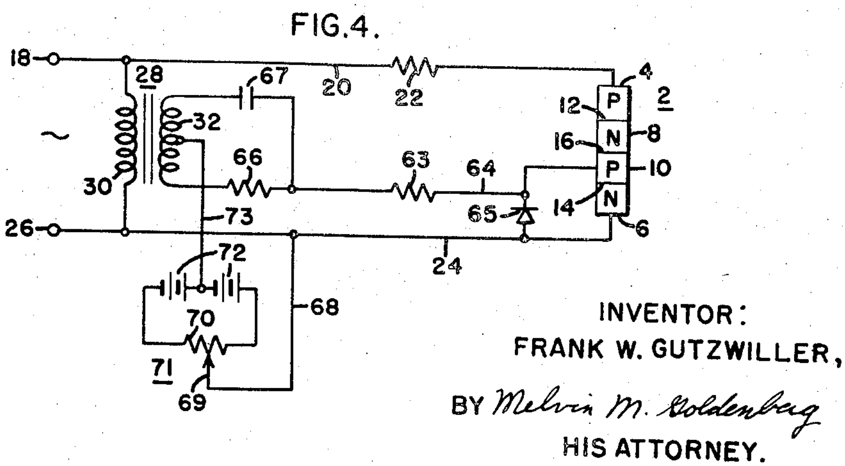
FIGURE 4 is a schematic illustration of still another alternative embodiment of the invention.

In many applications of the device, it is found desirable to provide a control circuit which is responsive to the level of a direct current voltage. The direct current voltage may be derived in a closed loop system from a circuit comparing a reference voltage and a feedback voltage indicative of or proportional to the condition of a load supplied by the device. Also, for some applications it may be found the range of phase shift in the control voltage effected by an R-C circuit, such as illustrated in FIGURE 1, may be limited. A control circuit which extends the range of phase shift by the addition of a variable direct current voltage to an alternating voltage which is shifted in phase a fixed amount is provided in the embodiment illustrated in FIGURE 4. In this figure, those elements which correspond to elements shown in the previously described figures have been given the same reference numeral. Thus the semi-conductor device 2 has its anode 4 connected through a load 22 and conductor 20 to a terminal 18 while its cathode 6 is connected via a conductor 24 to a terminal 26. The primary winding 30 of the transformer 28 induces an alternating voltage in the secondary 32 which is phase shifted by a circuit illustrated as constituted by a resistor 66 and capacitor 67. The circuit for the fixed phase shift alternating voltage is completed through the current limiting resistor 63, conductor 64 to the gate zone 10, cathode zone 6, conductor 24, a conductor 68 connected to the slider 69 engaging the resistance segment of a potentiometer 71 and a source of direct current voltage illustrated as a battery 72, a terminal of the battery and a conductor 73 to a tap on the secondary winding 32. For negative half cycles of the alternating voltage supplied to secondary 32, a circuit to the conductor 64 exists through the rectifier 65 rather than through the gate 10 and cathode 6 of the device 2. From an inspection of the figure, it may be seen that as the slider 69 is moved from right to left on the resistance segment 70, the level of positive direct current voltage supplied to the gate 10 increases.

Figure 5:
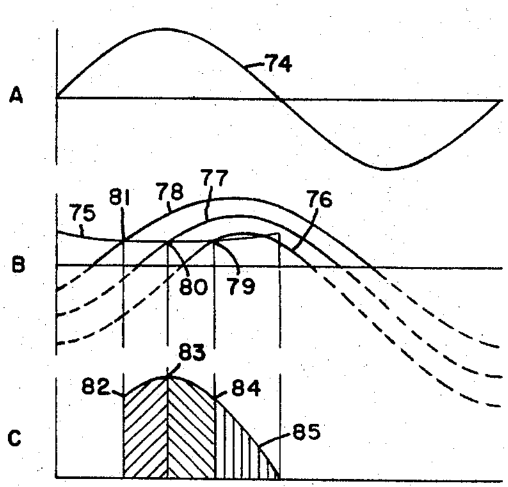
FIGURE 5 is a chart of voltage plotted against time of the circuit illustrated schematically in FIGURE 4.

The effect of this increase may be understood from a consideration of FIGURE 5. In FIGURE 5A, curve 74 represents the variation of the voltage applied across the device between the anode 4 and cathode 6. Curve 75 represents in FIGURE 5B the value of positive voltage necessary to reverse the bias of the junction 16 so as to cause the device 2 to conduct. Also, in FIGURE 5B the curves 76, 77 and 78 represent the values of the alternating voltages supplied to the gate 10 of the device. As the direct current voltage increases, the curves 76, 77 and 78 cross the curve 75 at successively more advanced points 79, 80 and 81 respectively permitting currents to flow through the load 22 starting at points 82, 83, and 84 on the curve 85 shown in FIGURE 5C.

Figures 6, 7:
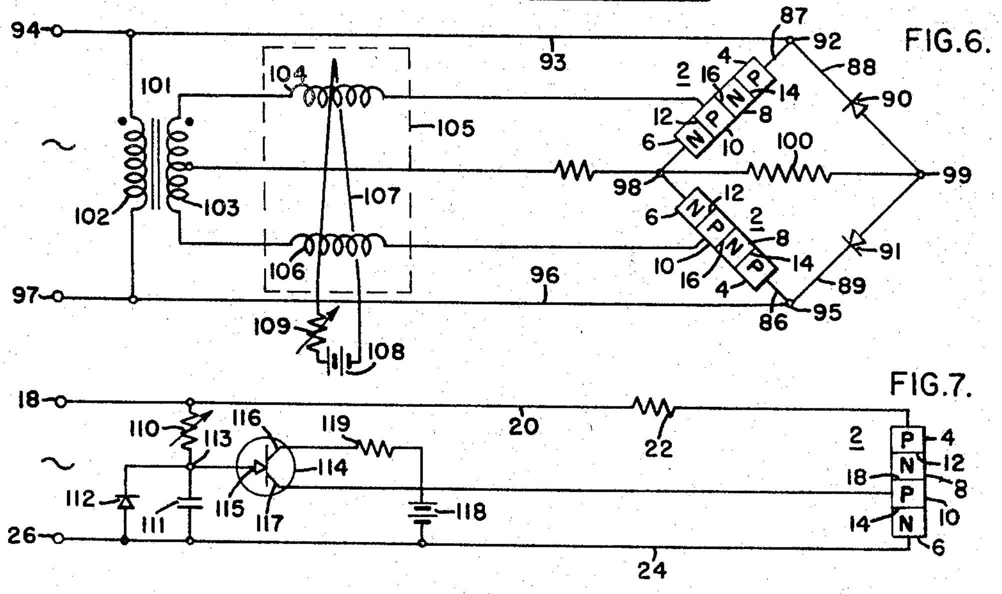
FIGURE 6 is a schematic illustration of yet another embodiment of the invention.
FIGURE 7 is a schematic illustration of still another embodiment of the invention.

FIGURE 6 of the drawing illustrates schematically another embodiment of the invention in which semi-conductor devices of the type described are connected in a full-wave rectifying circuit and an alternative control circuit is utilized. In this embodiment a full-wave rectifier bridge is constituted by a pair of conjugate arms 86 and 87 including the semi-conductor devices 2 and a second pair of conjugate arms 88 and 89 wherein a rectifying device 90 is included in the arm 88 and a rectifying device 91 is included in the arm 89. The bridge is provided with a first input terminal 92 connected via a conductor 93 to a terminal 94 and a second input terminal 95 is connected via a conductor 96 to a terminal 97. Output terminals 98 and 99 are provided a load illustrated as a resistance element 100 which may be connected thereacross.

The control circuit for the embodiment illustrated in FIGURE 6 comprises a transformer 101 having a primary winding 102 connected across the conductors 93 and 96 to supply an alternating voltage to a secondary winding 103. One end of the secondary winding 103 is connected to a main load winding 104 of a saturable reactor 105. The other end of the secondary winding 103 is connected to another main load winding 106 of the saturable reactor 105. The main load windings 104 and 106 may be wound on a suitable core structure of saturable magnetic material about which is also wound a control winding 107. The control winding 107 may be supplied from a source of unidirectional potential illustrated as a battery 108 and the current therethrough controlled by an adjustable resistor 109.

Saturable reactors of the type illustrated are normally constructed and operated so that the magnetic core or cores thereof are in a condition or direction of flux saturation such that upon the application of a current in a winding around the core, the effect is that for a first value of the current flow the direction and level of saturation remains the same and a low value of current flows in the winding. As the current increases, a value of current is reached which changes the level of saturation along a curve fixed by the core characteristics and a quantity equal to current (amperes) times the number of turns around the core until magnetic flux saturation is reached in the opposite direction, at which time an increased current will flow in the load winding and will be limited by the applied voltage and the impedance of the load winding and the load. The saturation level of such a reactor may be held at intermediate level, that is, at neither extreme by the provision of a control winding having a controlled voltage applied thereto. In the illustrated embodiment, this voltage may be supplied by the source 108 and the relative directions of the windings 104, 106 and 107 may be such that when a voltage of the correct polarity appears at the left-hand side of the winding 104, a controlled amount of the current will be necessary to complete the excitation of the reactor or drive the core into saturation in a direction so that load current will flow to the gate zone 10 of the semi-conductor device connected to the other end of the winding. When the voltage at the left-hand side of the winding 106 is of the proper polarity, the same results will ensue. So it may be seen that by controlling the current through the control winding 107, the point at which the saturable reactor 105 will pass current sufficient to fire one or the other of the semi-conductor devices 2 may be shifted in phase in relation to the voltage supplied to their anodes 4. The polarity dots shown in connection with the windings 102 and 103 of the transformer 101 show that they are wound in relation to each other so that their confronting ends always have the same polarity. Thus when the voltage at the terminal 92 is positive, the voltage on the load winding 104 is positive and at some point fixed by the current in control winding 107 the voltage on the intermediate zone 10 will be sufficiently positive to cause the device 2 in arm 87 to conduct and current to flow from terminal 92, through device 2, load 100 and rectifier 91 to terminal 95. When the voltage at terminal 95 is positive, current will flow therefrom through semi-conductor device 2 in arm 86 (determined by the point at which load winding 106 starts to pass load current), through load 100, rectifier 90 to terminal 92. As stated above in connection with the description of FIGURE 4, the direct current voltage supplied to control circuit may be derived from a sensing or comparison circuit constituting part of a controlled system.

In many applications of a semi-conductor device as described, it is desirable to control the firing or conduction of the device by the application of a voltage pulse or spike to the gate zone. Such a pulse when resulting in a current to the gate zone equal to or in excess of the value necessary to reverse the bias of the intermediate junction will cause the device to conduct, which conduction will be sustained as long as the anode or p-type outside zone is biased positively with respect to the cathode or n-type outside zone. Such control circuits offer the advantages of being relatively simple and consuming very little power. Also, the pulse nature of the control current results in negligible heating effects in the device as compared to the heating effects resulting from control current of prolonged duration such as one having a sinusoidal characteristic. A control circuit for supplying a voltage pulse having a variable phase relationship with the anode voltage of the semi-conductor device 2 is illustrated in FIGURE 7. In this figure, elements which correspond to elements previously described have been given the same reference numeral. Thus the semi-conductor device 2 is connected to a load 22 and via conductors 20 and 24 to the input terminals 18 and 26 respectively. Serially connected with each other and across the conductors 20 and 24 are an adjustable resistor 110 and a capacitor 111. A rectifying device 112 is connected to a junction 113 and is poled to conduct when the conductor 20 is negative with respect to the conductor 24. A semi-conductor device such as a double base diode or so-called unijunction transistor 114 has an electrode 115 connected to the junction 113 while a direct current bias voltage is provided between the electrodes 116 and 117 by the source 118 through a resistor 119.

The operation of this embodiment is as follows. When the conductor 20 is positive with respect to conductor 24 and the anode 4 of the device 2 is positive, the capacitor 111 charges through resistor 110. When the voltage across capacitor 111 reaches the peak emitter voltage of transistor 114 the transistor fires discharging the capacitor through a circuit including the zone 10 of the device 2. By varying the resistance of resistor 110 the charging rate of capacitor 111 is varied and consequently the point at which transistor 114 fires to control firing angle of device 2.

Figure 8:
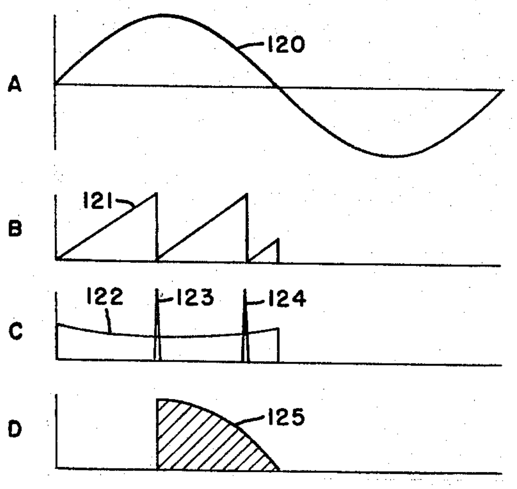
FIGURE 8 is a chart of voltage plotted against time of the operating characteristics of the circuit illustrated schematically in FIGURE 7.

FIGURE 8 illustrates typical relative values of current and voltage of the embodiment of FIGURE 7. Thus in FIGURE 8A, curve 120 represents the anode voltage on the device 2 while in FIGURE 8B curve 121 represents the voltage across capacitor 111. It is to be noted that the capacitor is charged repeatedly in a positive direction toward a limit which is the peak emitter voltage of the unijunction transistor 114 before discharging. In FIGURE 5C, the curve 122 represents the value of current necessary to cause the device 2 to conduct while the pulses 123 and 124 represent the values of current supplied to the gate or intermediate zone 10 of the device 2. Inasmuch as the pulse 123 reaches a peak greater than the values of the curve 122, the device 2 is fired at the time of its occurrence and a current as represented by curve 125 in FIGURE 8D will appear across a resistive load. The pulse 124 will have no effect on the device 2 inasmuch as it was fired by pulse 123 and device 2 will continue to conduct as long as its anode 4 is positive.

In each of the illustrated embodiments of the invention, means have been shown to provide a variable phase controlled current to an intermediate or gate zone of semi-conductor device having an odd number of p-n junctions so the point at which the device conducts may be controlled in response to external stimuli such as the selection of an operator and a control signal.

Although in accordance with the provisions of the patent statutes this invention is described as embodied in concrete form and the principle has been explained together with the best mode in which it is now contemplated applying that principle, it will be understood that the apparatus shown and described is merely illustrative and the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. In combination, a semi-conductor device comprising three p-n junctions constituted by four zones of semi-conducting material including in succession a first end zone of p-type material, a first intermediate zone of n-type material, a second intermediate zone of p-type material, a second end zone of n-type material, terminals connected to said end zones whereby a source of periodically variable electrical potential may be connected thereto, a conductor connected to one of said intermediate zones, and means for supplying voltage to said conductor varying in phase relationship to the potential supplied to said terminals and capable of exceeding in magnitude a value sufficient to cause the junction formed by said first and second intermediate zones to become biased in the forward direction.

2. In combination, a semi-conductor device comprising semi-conducting material zones of p and n types forming an odd number of p-n junctions and wherein at least an intermediate junction is biased oppositely to the outside junctions, means for supplying a voltage variable in magnitude to at least a value sufficient to reverse the bias of said intermediate junction to one of the zones, a surface of which constitutes a part of said intermediate junction and for varying the phase of the voltage.

3. In combination, a source of periodically variable potential, a load and a semi-conductor device connected in series with each other and said source, said semi-conductor device comprising a plurality of alternating p and n-type zones in succession and providing an odd number of p-n junctions whereby one of said intermediate junctions is biased oppositely to the end junctions, means for supplying to said device a potential variable in magnitude to at least a value sufficient to reverse the bias of said intermediate junction and for varying the phase of said potential in relation to said periodically variable potential.

4. In combination, a semi-conducting device comprising three p-n junctions in succession constituted by alternating zones of p and n-types of semi-conducting material, a source of alternating potential, means connecting said source to the end zones of said device whereby the end junctions are biased in a forward direction and an intermediate junction is biased in a reverse direction on one half cycle of the alternating potential and the end junctions are biased in reverse direction and the intermediate junction is biased in a forward direction on the other half cycle of the alternating potential, means for supplying to said intermediate junction a potential variable in magnitude to at least a value sufficient to cause said intermediate junction to become forwardly biased on said first-mentioned half cycle of alternating potential and for varying the phase relation of said potential to said alternating potential.

5. In combination, a semi-conducting device comprising three p-n junctions in succession constituted by alternating zones of p and n-types of semi-conducting material, a source of alternating potential, means connecting said source to the end zones of said device whereby the end junctions are biased in a forward direction and an intermediate junction is biased in a reverse direction on one half cycle of the alternating potential and the end junctions are biased in reverse direction and the intermediate junction is biased in a forward direction on the other half cycle of the alternating potential, circuit means connecting said source to said intermediate junction for applying a source-derived potential thereto, adjustable impedance means included in said circuit for varying the phase of said derived potential with respect to the phase of said alternating potential and for supplying a current to said intermediate junction at least equal in magnitude to a value sufficient to reverse the bias of said intermediate junction.

6. In combination, a semi-conducting device comprising three p-n junctions in succession constituted by alternating zones of p and n-types of semi-conducting material, conductors for connection to a source of alternating potential, means connecting said conductors to the end zones of said device whereby the end junctions are biased in a forward direction and an intermediate junction is biased in a reverse direction on one half cycle of an alternating potential applied to said conductors and the end junctions are biased in reverse direction and the intermediate junction is biased in a forward direction on the other half cycle of the alternating potential, a source of varying magnitude electrical signals providing signals at least equal in magnitude to a value sufficient to reverse the bias of said intermediate junction, means connecting said source to said intermeditae junction, adjustable impedance means included in said last mentioned connecting means for varying the phase of the signals in relation to the phase of an alternating potential applied to said conductors.

7. In combination, a semi-conducting device comprising three p-n junctions in succession constituted by alternating zones of p and n-types semi-conducting material, a source of alternating potential, means connecting said source to the end zones of said devices whereby the end junctions are biased in a forward direction and an intermediate junction is biased in a reverse direction on one half cycle of the alternating potential and the end junctions are biased in reverse direction and the intermediate junction is biased in a forward direction on the other half cycle of the alternating potential, a source of varying magnitude electrical signals providing signals at least equal in magnitude to a value sufficient to reverse the bias of said intermediate junction, and means connecting said second-mentioned source to said intermediate junction, said means including reactive and resistive impedance means, at least one of said last-mentioned means being adjustable whereby the phase of said signals may be shifted with respect to said potential.

8. In combination, a semi-conducting device comprising three p-n junctions in succession constituted by alternating zones of p and n-types semi-conducting material, a source of alternating potential, means connecting said source to the end zones of said device whereby the end junctions are biased in a forward direction and an intermediate junction is biased in a reverse direction on one half cycle of the alternating potential and the end junctions are biased in reverse direction and the intermediate junction is biased in a forward direction on the other half cycle of the alternating potential, a source of varying magnitude electrical signals providing signals at least equal in magnitude to a value sufficient to reverse the bias of said intermediate junction, and means connecting said second-mentioned source to said intermediate junction, said means including capacitive reactive elements and a resistive element forming a phase shifting network, one of said elements being adjustable whereby the phase of said signals may be shifted with respect to said potential.

9. In combination, a source of polyphase alternating current, a semi-conductor device comprising an odd number of p-n junctions in succession constituted by alternating zones of p and n-types of semi-conducting material, means connecting the end zones of said device between two phases of said source whereby the end junctions are biased in a forward direction and an intermediate junction is biased in a reverse direction on one half cycle of the current in one phase and the end junctions are biased in a reverse direction and said intermediate junction is biased in a forward direction on the other half cycle of current in said one phase, means connected between all of said phases of said source and said intermediate junction for supplying alternating potential thereto reaching a magnitude sufficient to cause said intermediate junction to become forwardly biased on said one-half cycle of alternating current, and said means including adjustable means to vary the phase of the alternating current supplied to said intermediate junction in relation to the phase of the potential supplied to said end junctions.

10. In combination, a source of polyphase alternating current, a semi-conductor device comprising an odd number of p-n junctions in succession constituted by alternating zones of p and n-types of semi-conducting material, means connecting the end zones of said device between two phases of said source whereby the end junctions are biased in a forward direction and an intermediate junction is biased in a reverse direction on one half cycle of the current in one phase and the end junctions are biased in a reverse direction and said intermediate junction is biased in a forward direction on the other half cycle of current in said one phase, a potentiometer connected between all of said phases of said source, and means coupling the output of said potentiometer to said intermediate junction for supplying potential thereto at least equalling in magnitude a value sufficient to cause said intermediate junction to become forwardly biased on said one half cycle of alternating current.

11. The combination of claim 9 including a unilateral conducting device connected between said intermediate junction and one of said first-mentioned phases of said source.

12. In combination, a semi-conducting device comprising three p-n- junctions in succession constituted by alternating zones of p and n-types of semi-conducting material, a source of alternating potential, means connecting said source to the end zones of said device whereby the end junctions are biased in a forward direction and an intermediate junction is biased in a reverse direction on one half cycle of the alternating potential and the end junctions are biased in reverse direction and the intermediate junction is biased in a forward direction on the other half cycle of the alternating potential, a phase retarding network connecting a source of alternating current to said intermediate junction, a source of unidirectional potential, means coupling said source of unidirectional potential to said intermediate junction, means for varying the unidirectional potential supplied to said intermediate junction to at least a value where the sum of the alternating current and said unidirectional potential is sufficient to reverse the bias of said intermediate junction.

13. In combination, a semi-conducting device constituted by an odd number of p-n junctions formed by alternating zones of p and n-types of semi-conducting material wherein an intermediate junction is biased oppositely to the outside junctions, a transistor having three electrodes, means connecting one of said electrodes to an intermediate zone of said semi-conductive device, means for biasing said transistor into an off condition, means for supplying a potential to a second electrode of said transistor to cause said transistor to conduct and supply current to said intermediate junction to reverse the bias of said intermediate junction.

14. In combination, a semi-conducting device constituted by an odd number of p-n junctions formed by alternating zones of p and n-types of semi-conducting material wherein an intermediate junction is normally reversed bias and the outside junctions are forwardly biased, a unijunction transistor having three electrodes including an emitter electrode, means connecting another electrode of said transistor to said intermediate junction, means for supplying bias between said another electrode and one other electrode, a source of alternating potential, a resistor and a capacitor connected in series with each other across said source and means connecting said emitter electrode to a junction of said resistor and said capacitor.

15. The combination of claim 1 wherein the means for supplying voltage to the conductor comprises a pulse generator.

16. The combination of claim 1 including a unilateral conducting device connected in reversely poled parallel circuit relation with the p-n junction formed by the intermediate zone connected to the conductor and the end zone contiguous with said intermediate zone.

References Cited

UNITED STATES PATENTS

| | | | |
|---|---|---|---|
| 2,877,359 | 5/1959 | Ross | 307—88.5 |
| 2,229,449 | 1/1941 | Garman | 321—40 X |
| 2,247,167 | 6/1941 | Edwards | 321—40 X |
| 2,504,834 | 5/1950 | Hartwig | 323—23 |
| 2,510,652 | 6/1950 | Parsons et al. | 321—40 X |
| 2,568,391 | 9/1951 | Geiselman | 321—40 X |
| 2,697,197 | 12/1954 | Brown | 321—40 X |
| 2,799,000 | 7/1957 | Casanova | 321—40 |

MILTON O. HIRSHFIELD, *Primary Examiner.*

WARREN E. RAY, *Assistant Examiner.*